April 17, 1928.
R. CARLSTEDT
1,666,438
ELECTRIC POWER REGULATION
Filed June 11, 1924
2 Sheets-Sheet 1
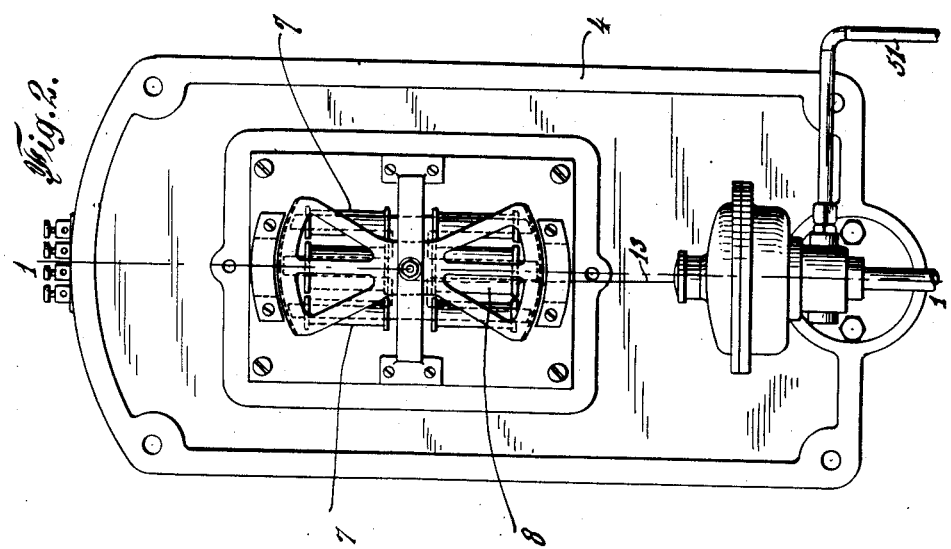
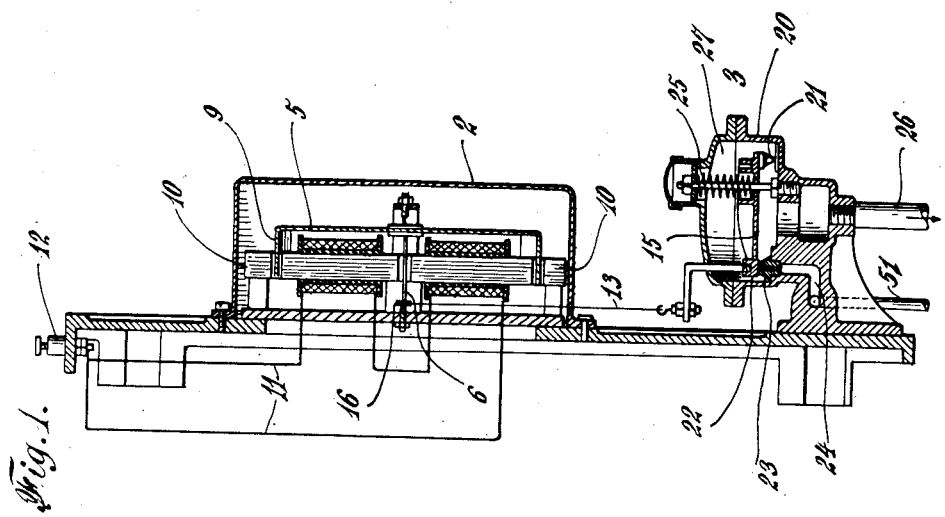
Ragnar Carlstedt
INVENTOR
BY Wm T Hedlund
his ATTORNEY

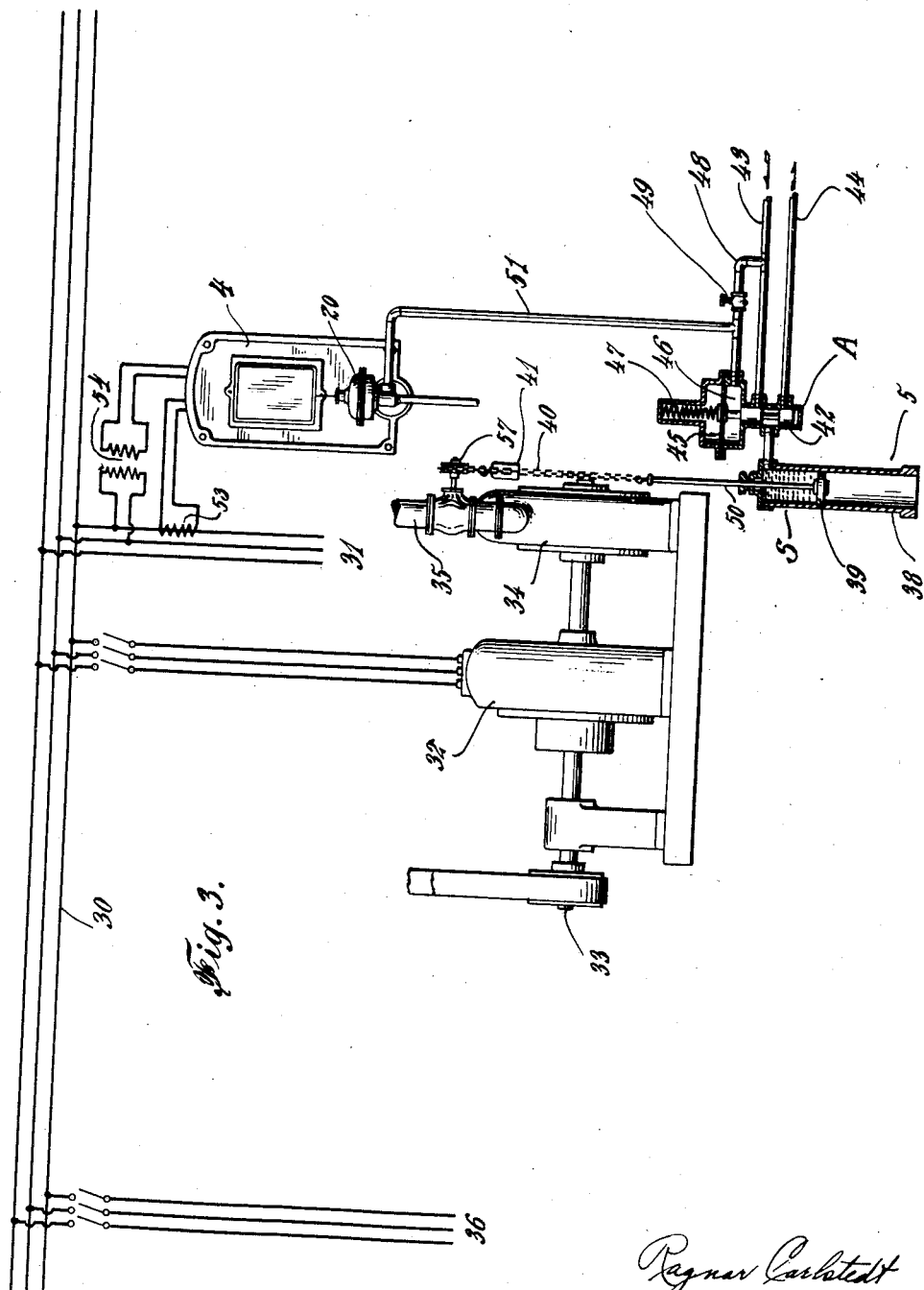

Patented Apr. 17, 1928.

1,666,438

UNITED STATES PATENT OFFICE.

RAGNAR CARLSTEDT, OF STOCKHOLM, SWEDEN, ASSIGNOR TO ARCA REGULATORS, INCORPORATED, OF NEW YORK, N. Y., A CORPORATION OF VIRGINIA.

ELECTRIC POWER REGULATION.

Application filed June 11, 1924, Serial No. 719,348, and in Sweden June 27, 1923.

My invention relates to electric power regulation and more specifically to an apparatus for controlling the supply of electric current in power plants to take care of peak loads. My invention further comprises a watt relay for use in such plants.

The purpose of my invention is to provide a watt responsive regulator of extreme sensitiveness.

A further object of my invention is the application of my watt responsive regulator in an electric system of varying load in a manner that lessens considerably the cost of electric current.

In a number of industries it is customary to purchase the power for operating plants from electric power supply plants situated outside the plant. This power is purchased in a definite constant amount. The power consumption of plants is usually extremely variable and effort is made to cover the peaks above the purchased amount within the plant, for example, by means of a generator, which is driven through a transmission or the like from a water motor or steam engine. Such a generator must be regulated so that the amount supplied from the outside may be maintained constant or approximately so. If the amount subscribed for is exceeded the excess must be paid for at an increasingly higher rate.

Regulation of this kind has not hitherto been satisfactory, there being no sufficiently sensitive and accessible apparatus able to operate in response to feeble impulses of the electric circuit and transmit this impulse to the regulation mechanism.

The present invention eliminates these defects and provides an apparatus sufficiently sensitive to accomplish the desired regulation.

The invention is set forth in accompanying drawings in which:

Fig. 1 is a cross section of the watt relay taken on line 1—1, Fig. 2.

Fig. 2 is a front view of the watt relay.

Fig. 3 is an organization view of parts of an electric power system in which the watt relay is used, showing an arrangement in which my watt relay is particularly adaptable.

The watt relay consists principally of two parts, an electric effect device 2, and a liquid pressure device 3. These two parts are both mounted on a wall panel 4.

The electric effect device operates in response to voltage and amperage, that is, in response to power and in turn controls the liquid pressure device. Any device which will perform this function may be used for the electric effect device. For purposes of illustration, I have shown the same made with a series of magnets, the middle of which, 7, are responsive to voltage and the outer of which, 8, are responsive to amperage. The windings surrounding the cores of the magnets are connected by means of wires 11 with binding posts 12. A disc 5 is supported by and rotatable about shaft 6. This disc is formed with flanges 9 extending between the cores 7 and 8 and extension magnets 10. The disc moves about a shaft 6 in response to variations in the magnetic field.

On the shaft 6 is a wheel 16, on which a wire 13 is adapted to be wound and unwound upon rotation of the shaft. This wire is connected to a lever 15 forming part of the liquid pressure part of the relay.

The liquid pressure device 3 comprises a housing 20 enclosing lever 15. Lever 15 is pivoted at 21 on point bearings which gives a frictionless mounting. 22 indicates a baffle plate at the opposite end of the lever, which is situated in front of the orifice in nozzle 23. Nozzle 23 forms the outlet of passage way 24 through which a continuously flowing stream of liquid passes, this stream of liquid being controlled by movement of the baffle plate relative to the nozzle. Variations in distance between the baffle plate and the nozzle cause variations in pressure in passage way 24, which variations are utilized to operate a control member as hereinafter set forth. Spring 25 acts on lever 15 in opposition to tension exerted by wire 13 and the pressure of the jet of liquid playing against baffle plate 22. 26 designates a drain from jet chamber 27.

The relay is connected in known manner to the electric circuit by connection with binding posts 12. The electric effect device and the liquid pressure device are preferably so connected that a decrease of power in the electric circuit causes a suppression of the jet issuing from the nozzle. It is apparent that regulation for varying amounts of power can be effected by adjustment of spring 25.

In Fig. 3, 32 designates an electric motor, the current for which is supplied from the outside through wires 31 and by means of the inside leads 30. The power from the outside source is to be maintained at a constant value. Motor 32 may operate various machinery in the plant through transmission devices such as belts and pulleys connected to shaft 33. A power machine, such as a turbine 34, also operates on the same shaft. Other current consuming apparatus, for example, motors, may also be connected to the leads 30 and 36.

S designates a servo-motor which operates to control the supply of steam through steampipe 35 to turbine 34. The servo-motor comprises a cylinder 38, containing a piston 39. Piston rod 50 is connected to chain 40 passing over sprocket 57 connected to the valve spindle of the control valve for the turbine. At the other end of chain 40 is attached a counter-weight 41.

A designates an actuating means for controlling the pressure of liquid in the servo-motor. The actuating means comprises a pilot valve 42 which is recessed and upon movement controls communication between cylinder 38 and either a supply conduit 43 or a discharge conduit 44. Attached to the piston is a diaphragm 45 which is securely fastened to the main housing of the actuating means. Diaphragm chamber 46 is formed between the diaphragm, the pilot valve and the housing of the actuating means. This diaphragm chamber 46 has liquid communication with passage way 24 in housing 20 by means of pipe 51. Branched off from the supply conduit 43 is a branch conduit 48, having a restriction 49 therein, and affording communication between the supply conduit, diaphragm chamber 46 and housing 20. The purpose of restriction 49, which, for purposes of illustration I have shown as a hand valve, is to allow movement of baffle plate 22, to cause changes of pressure in chamber 46. Spring 47 acts against the pilot valve in opposition to the liquid pressure in chamber 46.

The operation of the plant is as follows:
Suppose the load of the plant increases. The current supply in leads 31 is then increased whereby disc 5 is rotated due to the increased excitation of the watt responsive device by means of current transformer 53 and voltage transformer 54 in such a manner that lever 15 is raised against the action of spring 25. The result of this is that more liquid passes out through the opening between nozzle 23 and baffle plate 22, and consequently the pressure in diaphragm chamber 46 decreases. Pilot valve 42 is then moved downwardly due to the preponderance of the force of spring 47 over the liquid pressure in chamber 46. This in turn effects communication between the servo-motor S and discharge conduit 44 and counter-weight 41, then overcomes the liquid pressure in cylinder 38 and moves the sprocket 57 to increase the flow of steam through conduit 35 so that turbine 34 will supply more power to take care of the excess requirement.

Thus when the peak loads above the average quantity purchased occur the regulator acts to add power to the circuit by means arranged within the plant.

If the load of the plant drops the motor operation is the reverse, whereby the starting valve of the power engine is somewhat closed, and less power generated.

In many cases the diaphragm valve acting between the relay and servo-motor may be omitted, and the relay act directly on the servomotor, which is preferably arranged so as to act directly on the valve spindle.

If the current supplied to the pant is, for example, direct current with constant voltage, instead of the described relay, an ampere relay may be used.

Having thus described my invention what I claim as new and desire to protect by Letters Patent of the United States is:

1. Electric power regulating apparatus comprising a movable watt responsive member, a main control member, liquid pressure operated means to control said main control member, a housing, means forming a passage-way having an outlet for discharging a continuously flowing stream of liquid into said housing, a restriction in said passage-way, a lever mounted to control the outflow of liquid from said passage-way, means to move said lever in accordance with variations in the watt responsive member, and means whereby changes in liquid pressure in said passage-way between the outlet and the restriction caused by movements of said lever affect the liquid pressure operated means.

2. Electric power regulating apparatus comprising a member movable in response to changes in amperage, a main control member, liquid pressure operated means to control said main control member, a housing, means forming a passage-way having an outlet for discharging a continuously flowing stream of liquid into said housing, a restriction in said passage-way, a lever mounted to control the outflow of liquid from said passage-way, means to move said lever in accordance with variations in the amperage responsive member and means whereby changes in liquid pressure in said passage-way between the outlet and the restriction caused by movement of said lever affect the liquid pressure operated means.

3. Electric power regulating apparatus comprising a member movable in response to changes in amperage, a main control member, a housing, means forming a passage-way having an outlet for discharging a continuously flowing stream of liquid into said housing, a restriction in said passage-way, a lever mounted to control the outflow of liquid from said passage-way, means to move said lever in accordance with variations in the amperage responsive member and means whereby changes in liquid pressure in said passage-way between the outlet and the restriction caused by movement of said lever operate to control said main control member.

4. Electric power regulating apparatus comprising a rotatable member, means to rotate said member in accordance with changes in amperage, a housing, means forming a passage-way having an outlet for discharging a continuously flowing stream of liquid into said housing, a restriction in said passageway, a lever mounted to control the outflow of liquid from said passage-way, means to transmit rotating movement of said rotatable member to rocking movement of said lever, a main control member, and means whereby changes in liquid pressure in said passage-way between the outlet and the restriction caused by movement of said lever operate to control said main control member.

5. Electric power regulating apparatus comprising a rotatable member, means to rotate said member in accordance with changes in amperage and voltage, a housing, means forming a passage-way having an outlet for discharging a continuously flowing stream of liquid into said housing, a restriction in said passage-way, a lever mounted to control the outflow of liquid from said passage-way, means to transmit rotating movement of said rotatable member to rocking movement of said lever, a main control member, and means whereby changes in liquid pressure in said passage-way between the outlet and the restriction caused by movement of said lever operate to control said main control member.

6. Electric power regulating apparatus comprising a member movable in response to changes in amperage including a shaft, a wheel on said shaft, a main control member, a housing, means forming a passage-way having an outlet for discharging a continuously flowing stream of liquid into said housing, a restriction in said passage-way, a lever pivotally mounted on point bearings and arranged to control outflow of liquid from said passage-way, a flexible member attached to said lever and wound about said wheel and arranged to move said lever in accordance with variations in amperage and means whereby changes in liquid pressure in said passage-way between the outlet and the restriction caused by movement of said lever operate to control said main control member.

In testimony whereof I hereunto affix my signature.

RAGNAR CARLSTEDT.